United States Patent [19]
Riza

[11] 3,777,836
[45] Dec. 11, 1973

[54] MOTOR DRIVEN GOLF CART

[76] Inventor: Warren D. Riza, P.O. Box 78, Cleburne, Tex. 76031

[22] Filed: Sept. 22, 1971

[21] Appl. No.: 182,756

[52] U.S. Cl. .............................. 180/26, 280/DIG. 5
[51] Int. Cl. ............................................ B62d 21/12
[58] Field of Search ............. 180/26 R, 26 A, 25 R, 180/25 A, 27, 13; 74/242.11; 280/DIG. 5

[56] References Cited
UNITED STATES PATENTS

| 2,825,416 | 3/1958 | Schroeder et al. | 180/26 R |
| 2,973,048 | 2/1961 | Jensen | 280/DIG. 5 |
| 3,043,389 | 7/1962 | Steinberg | 280/DIG. 5 |
| 3,117,648 | 1/1964 | Landreth | 180/25 A |
| D178,341 | 7/1956 | Dacus | 280/DIG. 5 |
| 3,229,782 | 1/1966 | Hilton | 180/26 R |
| 2,664,757 | 1/1954 | Shaw | 74/242.14 R |

Primary Examiner—Kenneth H. Betts
Assistant Examiner—J. M. McCormack

[57] ABSTRACT

This invention consists of seven basic structures that when assembled provide a one man golf cart that can be dissassembled for transportation in the trunk of an automobile to a golf course. The seven basic structures comprise an L-shaped frame; a receptacle on the back and lower end of the L-shaped frame; in which is placed a golf bag; two removable rear wheels; a removable seat; means of supporting the upper end of the aforesaid golf bag; and a front wheel supported by structure adapted to secure the front end of the aforesaid L-shaped frame are all part of this novel invention. The above mentioned structure of the aforesaid front wheel also supports removable structure on which is located the internal combustion engine that propels the golf cart by means of both belt and chain drive mechanism. A handle bar is supported by the same structure that supports the aforesaid internal cumbustion engine.

2 Claims, 4 Drawing Figures

INVENTOR
WARREN D. RIZA

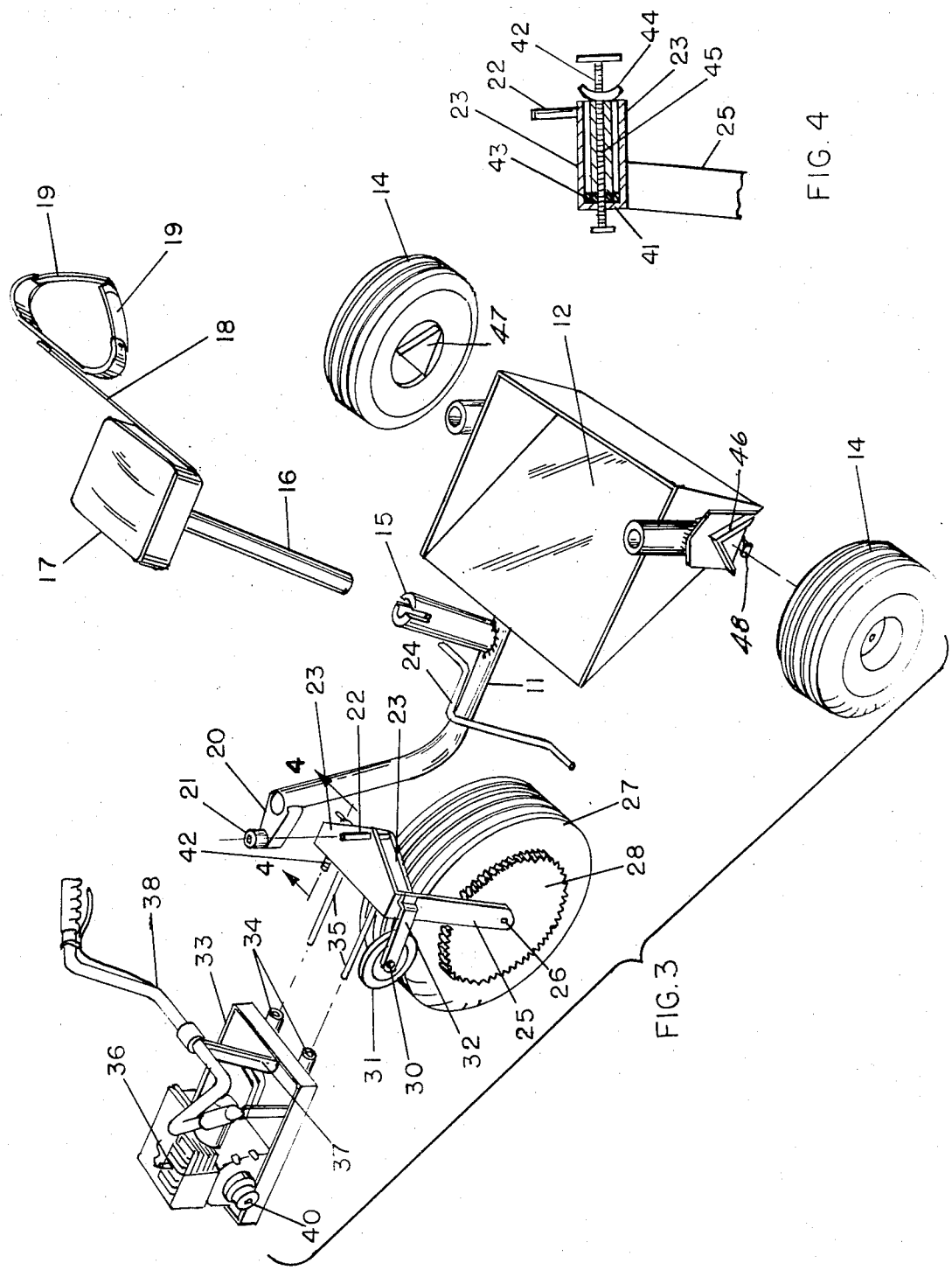

MOTOR DRIVEN GOLF CART

This invention relates to golf carts; more particularly, to motor driven golf carts; still more particularly, to golf carts powered by an internal cumbustion engine.

While a large number of motor driven golf carts have been developed and placed on the market in recent years, they are not only heavy vehicles but are also expensive to purchase.

It is therefore the principal object of this invention to provide a motor driven golf cart that by reason of it's simple design is light in weight and inexpensive to purchase.

Another object of this invention is to provide a motor driven golf cart that is so constructed that it can be disassembled in a matter of minutes for transportation in the trunk of an automobile to and from the golf course.

Another object of this invention is to provide a motor driven golf cart that has a minimum number of parts that can be easily manufactured without the use of special machinery and/or tools.

Still another object of this invention is to provide a motor driven golf cart of the character herein described that has only six major parts, thus making it possible to store the cart in a minimum of space during the winter months when it will not be in use.

Other and further objects and advantages of this new and novel motor driven golf cart will no doubt come to mind as the reading of this specification and its appended claims proceeds and the accompanying drawings are read in connection therewith.

In the drawings:

FIG. 3 is a pictorial exploded view of this invention showing its six parts which are the major parts.

FIG. 4 is an enlarged sectional view of one detail of this invention, taken substantially along line 4—4 of FIG. 3, and viewed in the direction indicated by the arrows.

In the several views of this invention, like parts of this motor driven golf cart are indicated by like reference numbers. The reference number 10 indicates this invention in its entirety.

Figure 1:
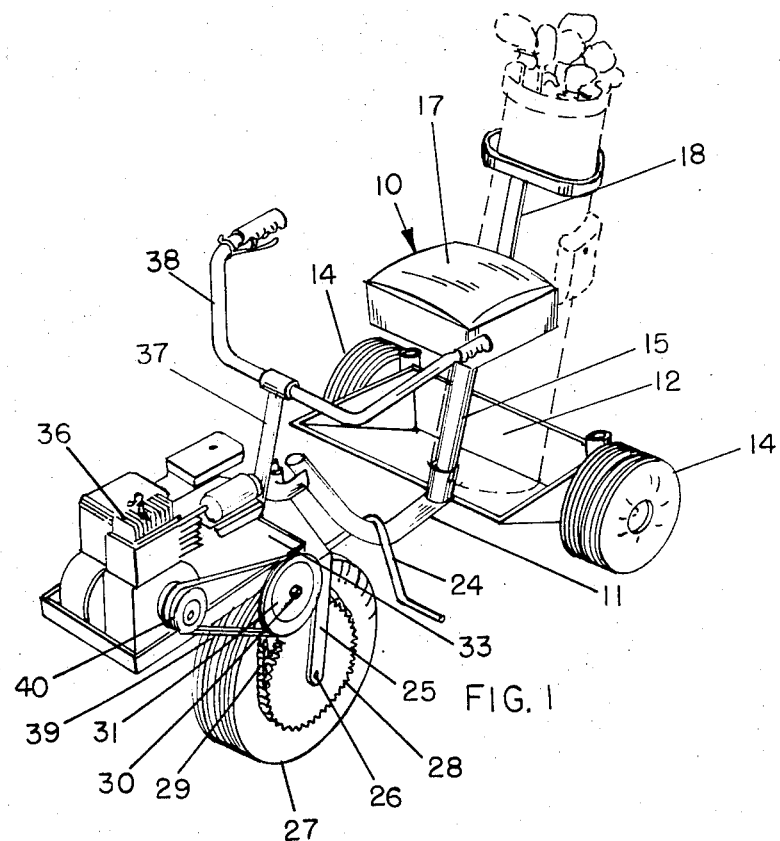
FIG. 1 is a pictorial view of this invention in its entirety and all ready for use on the golf course. A golf bag and clubs are shown in phantom lines on the rear end of the cart.
Figure 2:
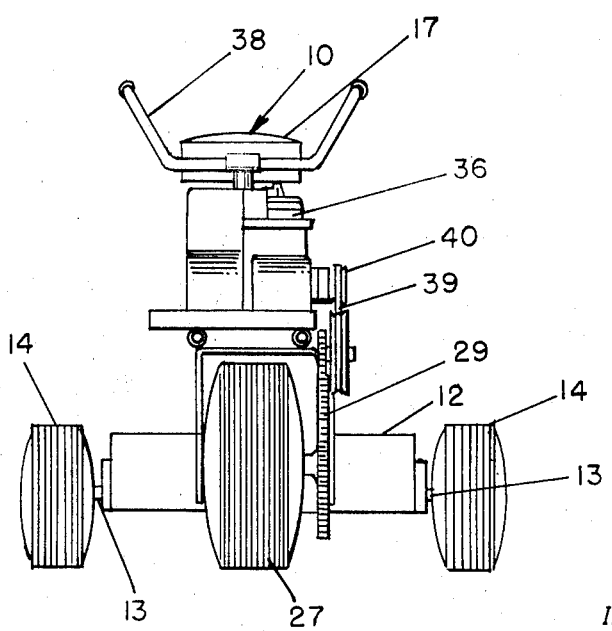
FIG. 2 is a front view of this invention.

Looking first at FIG. 1 of the accompanying drawing it will be seen that this invention 10 consists of an L-shaped frame 11 to the lower and rear end of which is secured a receptacle 12 that is rectangular when viewed from the top and triangular when viewed from the ends. Stub axles 13 support the rear wheels 14. An angularly disposed tube 15 extends upwardly from the rear end of the aforesaid L-shaped frame, which is fabricated from tubing, to receive the tubular member 16 on top of which is mounted the seat 17. A golf bag holding member 18 embodying two flexible straps 10 is suitably secured to the rear end of the aforesaid seat 17. The golf bag rests in the aforesaid receptical 12.

Continuing to look at FIG. 1 of the drawings, as well as at FIG. 3, it will be observed that the front and upper end of the aforesaid L-shaped frame is provided with a triangularly shaped member 20, having a tubular socket 21, that projects vertically upward from the apex of the aforesaid member 20 for the reception of the vertically disposed pin 22 that is located in the apex of the horizontally disposed plates 23 that are in equal and parallel spaced relation to one another, as one can see by looking at the aforesaid FIG. 3 of the drawings. An inverted V-shaped bar 24 has its apex secured to the aforesaid L-shaped frame 11 for a foot support. A vertically disposed bar 25 extends downward from each side of the aforesaid plates 23 in order to provide support for the axle 26 of the front wheel 27. A large sprocket 28 is secured on one end of the axle 26 for the reception of the drive chain 29 that also encompasses a smaller sprocket which is mounted on the shaft 30 that also supports the pulley 31. The aforesaid shaft 30 is held by the horizontally disposed bar 32 that projects forward from the upper end of the aforesaid bar 25 of this invention.

Continuing to look at FIG. 3 of the drawings it will be seen that a rectangular horizontally disposed support plate 33 has side walls vertically disposed creating a pan or tub. This pan or tub being so designed as to be a catch basin for drippings of oil or gasoline from the aforesaid internal combustion engine 36 from being deposited on the interior of the carrying vehicle. Along the bottom or underside of plate 33 there are two equally spaced and parallel steel tubes 34 secured in a longitudinal position to the underside of the aforesaid motor support plate 33. The two aforesaid steel tubes 34 are adapted to receive the two equally spaced and parallel steel bars 35 that project horizontally forward from between the aforesaid horizontally disposed plates 23, thus providing novel means of support for the internal combustion engine 36 that is secured vertically to the upper side of the motor support plate 33. An angularly disposed steel tube 37 extends upward from the lateral center and back side from the aforesaid motor support plate 33 to support the handle bars 38 of this invention.

An endless belt 39 encompasses in part the motor pulley 40 and the already mentioned pulley 31, thereby providing a means for the aforesaid internal combustion engine 36 to propel the golf cart 10 forward through the aforesaid drive chain 29.

Obviously this invention must be provided with some means of taking up the slack in the aforesaid endless belt 39 in order to provide maximum power from the internal combustion engine 36 as driver for the aforesaid front wheel 28. This belt take-up mechanism is clearly detailed in FIG. 4 of the drawings and though being described no claim is made. The front edge of the two aforesaid horizontally disposed plates 23 are welded or otherwise secured to a vertically disposed plate 41. A horizontally disposed threaded rod 42 is screwed into the nut 43 which is welded onto the aforesaid plate 41 having an opening therein through which the aforesaid threaded rod 42 passes. A wing nut 44, having a pipe extension 45, is placed in the position shown in FIG. 4 of the drawings, thereby providing a means of tightening up of the already described endless belt 39 of this invention.

No attempt has been made to describe the controls for the aforesaid internal combustion engine 36 of this invention since no claim is being made for them as they can be of any design and type known to be satisfactory to those experienced in the art.

Looking again at FIG. 3 wherein the said frame 11 is L-shaped in configuration and made of tubular steel is provided with an inverted equilateral triangular receptacle 46 having offsets protruding inward of two sides forming an inner area larger than the protruding restrictions which hold the rear wheel axle 13. The axle being a pin protruding from an equilateral triangular plate 47 of the same size as inner area of receptical 46. This invention is called the diamond lock wheel support.

Being an equilateral triangular design permits instant alignment and insertion of the wheel axle support plate 47 into receptacle 46 without the worry of alignment and can not be placed in the wrong position.

The golf cart is also equipped with a spring loaded safty lock 48 under said frame that provides a safe wheel locator to hold wheel axle plate 47 into receptacle 46 when wheel is accidentally raised off the ground.

Being spring loaded the safty lock 48 can be snapped back by hand and permits the said wheels 14 on axle 47 to be removed for transporting without the use of any tools.

It is to be throughly understood that the novel feature of this invention is that the golf cart is so designed and constructed that it can be disassembled into six parts for transportation in an ordinary automobile to the previously mentioned golf course. This can easily be done by one man in a matter of minutes without the use of any tools.

This invention is subject to any changes and or modifications that one may care to make in so long as the changes and/or modifications fall within the scope and intent of the appended claims.

What I now claim as new is:

1. A motor driven golf cart of the character described, comprising a frame supporting a removable seat to which is attached structure adapted to encompass and hold the upper portion of a golf bag back of the said seat; and a receptacle secured to the lower and rear end of said frame, the said receptacle being adapted to receive and support the said golf bag; and two removable rear wheels; and a removable front wheel that supports a removable engine support structure on which is mounted an internal combustion engine to the upper surface thereof; said engine adapted to move said golf cart by both an endless belt and a chain drive; the said removable structure comprising a horizontally disposed rectangular plate having sidewalls that form a pan to confine spills from said engine and further comprising an angularly disposed tube extending upwardly from the lateral center and rear of the said rectangular plate for the support of handlebars; and two equally spaced tubes secured in a longitudinal position to said support plate adapted to receive two equally spaced bars that project horizontally forward from the crown which joins forks supporting said front wheel.

2. The invention of claim 1 in which the two rear wheels are secured to said receptacle by wheel locks, said wheel locks comprising an inverted V-shaped receiving member having offsets protruding inwardly on each side of said receptacle; said member adapted to receive rear wheel axle plates, said plates being equilateral triangle in shape and having a stub axle protruding therefrom; said plates also being the same size as the inner area of said member.

\* \* \* \* \*